No. 662,294. Patented Nov. 20, 1900.
J. R. OKELL.
COFFEE ROASTING APPARATUS.
(Application filed Jan. 17, 1900.)
(No Model.) 3 Sheets—Sheet 2.

No. 662,294. Patented Nov. 20, 1900.
J. R. OKELL.
COFFEE ROASTING APPARATUS.
(Application filed Jan. 17, 1900.)

(No Model.) 3 Sheets—Sheet 3.

Witnesses
Marcus L. Byng
Edgar M. Kitchin

Inventor
John R. Okell
by
his Attorneys

UNITED STATES PATENT OFFICE.

JOHN R. OKELL, OF SCRANTON, PENNSYLVANIA.

COFFEE-ROASTING APPARATUS.

SPECIFICATION forming part of Letters Patent No. 662,294, dated November 20, 1900.

Application filed January 17, 1900. Serial No. 1,782. (No model.)

*To all whom it may concern:*

Be it known that I, JOHN R. OKELL, a citizen of the United States, residing at Scranton, in the county of Lackawanna and State of Pennsylvania, have invented certain new and useful Improvements in Apparatus for Roasting Coffee and other Granular Substances; and I do hereby declare the following to be a full, clear, and exact description of the invention, such as will enable others skilled in the art to which it appertains to make and use the same.

My invention relates to improvements in apparatus for roasting coffee and other granular substances; and it consists in a roaster comprising an air-tight casing, a drum for carrying and agitating the coffee mounted in said casing, a furnace connected directly with the drum and adapted to discharge hot air into the same, said furnace having an air-inlet for introducing a light volume of air above the fuel.

It also consists in a roaster having an inclosing casing, an agitating-drum mounted therein, a furnace for introducing heated gases into the said drum, a smoke-flue for conducting the products of combustion from the said casing, a smoke-stack connected with the said flue, a portion of the said stack being enlarged, whereby the draft will be somewhat weakened at that point to permit chaff and other substances to fall away from the smoke or other products of combustion, and a damper in the said stack controlling the draft therein.

It also consists in improved means for carrying off chaff or other waste from the roasting apparatus.

It also consists in improved means for regulating the discharge of roasted material from the roasting-drum.

It also consists in certain other novel constructions, combinations, and arrangements of parts, as will be hereinafter fully described and claimed.

Figure 1:
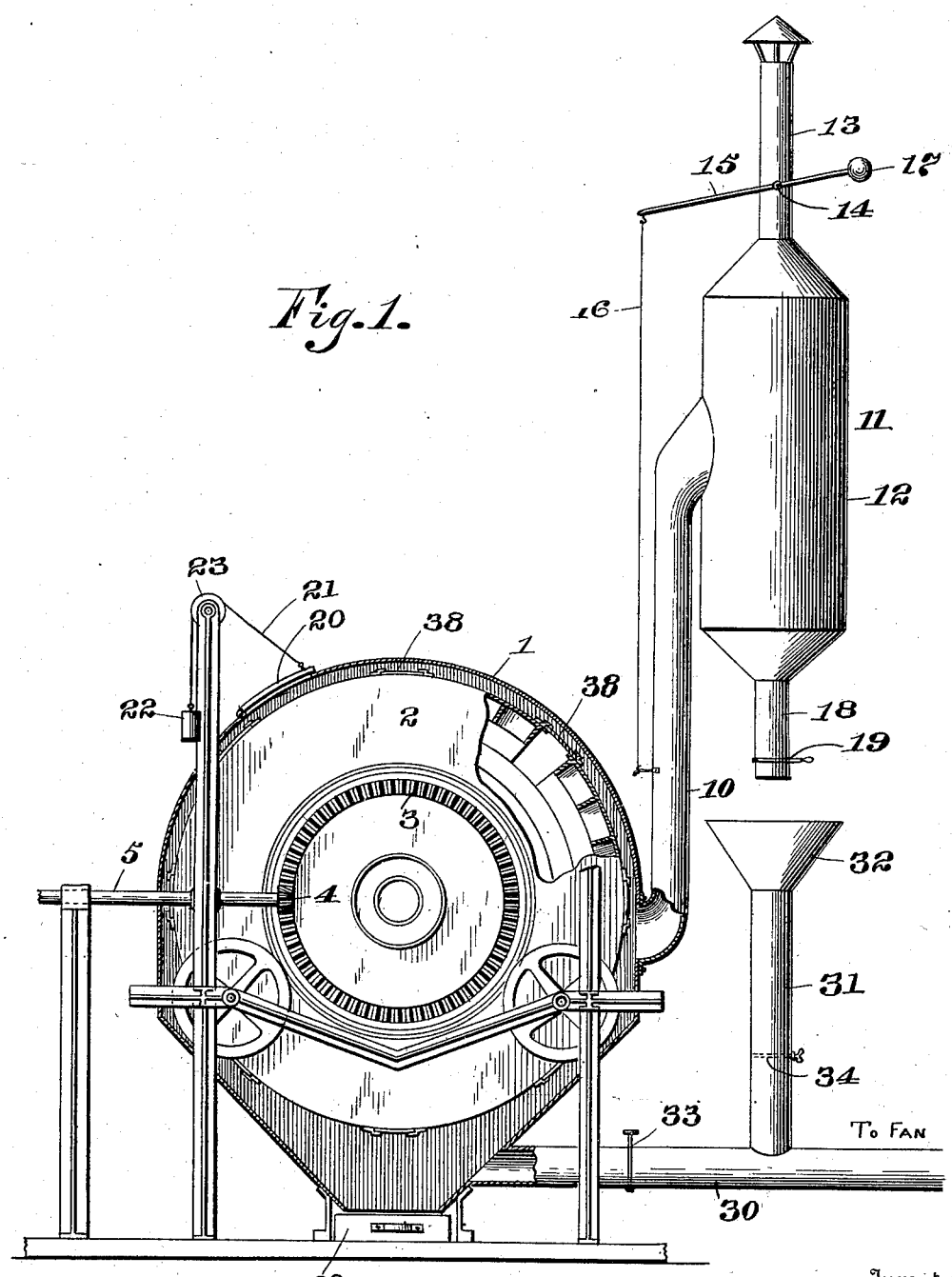
Figure 2:
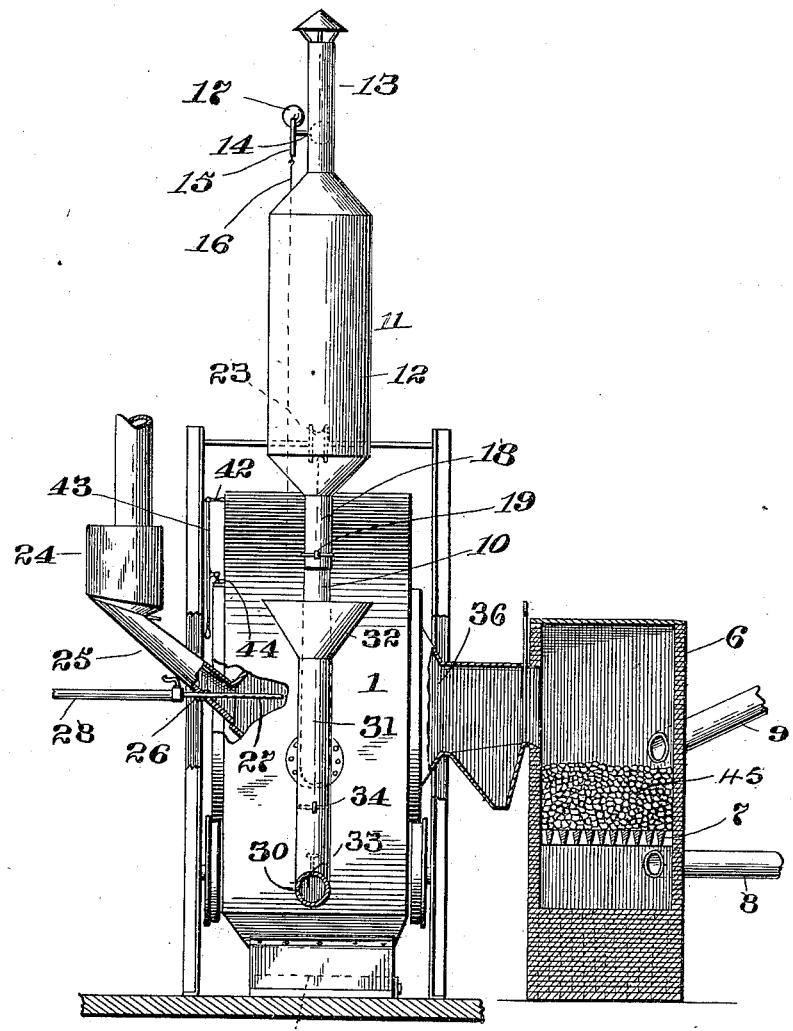
Figure 3:
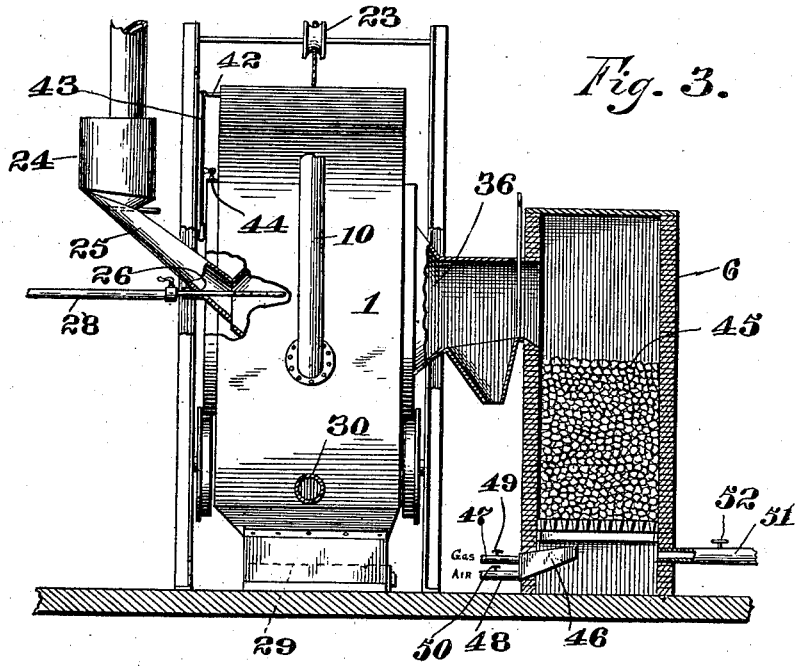
Figure 4:
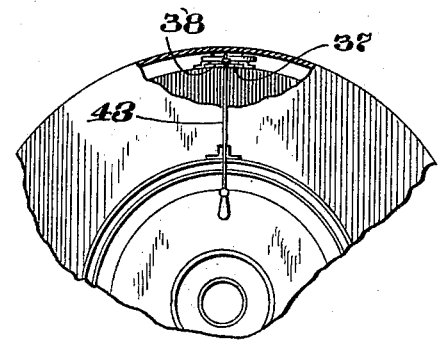
Figure 5:
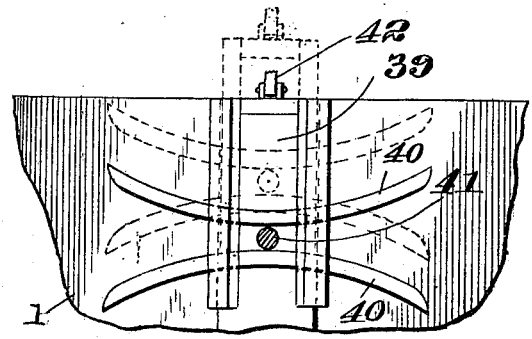

In the accompanying drawings, Figure 1 represents a side elevation of a roasting apparatus, showing the construction of the stack for conducting the products of combustion therefrom, the means for operating the peripheral doors of the drum being omitted. Fig. 2 represents a vertical cross-section through the roasting apparatus and a furnace for throwing hot air into the same, the means for supplying fuel to the furnace being omitted. Fig. 3 represents a view, partly in elevation and partly in vertical cross-section, through an apparatus constructed in accordance with my invention, the pipe for introducing air into the furnace above the fuel being omitted. Fig. 4 represents a detail view in elevation of part of one end of the drum, a portion being broken away at the top, showing the lever for operating the discharge gates or slides on the periphery of the drum. Fig. 5 represents an inverted plan view of a portion of the periphery of the drum, showing the manner of moving the discharge gates or drums on the periphery thereof.

My improved roasting apparatus consists in a hollow casing 1, which is closed to the atmosphere and in which is mounted a revolving drum, as 2, provided with suitable agitating means for agitating and mixing the coffee to be roasted. The said drum is provided with a bevel-gear, as 3, adapted to engage a bevel-pinion 4 on the actuating-shaft 5, by which the said drum may be rotated. All of this mechanism I preferably construct in the same manner as the coffee-roasting apparatus is formed which is described in Letters Patent to me, No. 593,163, dated November 2, 1897. The drum 2 is also provided with suitable doors upon its periphery for discharging roasted material.

To one side of the casing 1 is located a furnace 6, that is built closely to the side of the casing and is connected directly with the drum 2, so that its volume of heat will impinge directly upon the falling material in the revolving drum. The said furnace is preferably provided with a suitable grate 7, and an air-blast, as 8, is introduced below the grate to produce a forced draft. I also preferably introduce a light volume of air over the top of the fuel, as at 9, to assist in the proper combustion of the fuel. Thus by the regulation of this air-inlet thorough combustion is assured, and the production of smoke in the furnace may be greatly modified, if not entirely prevented. The products of combustion entering the drum pass out through the screens, or the perforated periphery thereof into the casing and are thence led, by means of a draft or smoke flue 10, into the smoke-stack 11. The smoke-stack 11 is formed with an enlarged portion, as 12, where the smoke-pipe 10 enters the same, the portion above and below the enlarged portion being reduced to an ordinary size. In the upper portion 13 of the stack is mounted a damper 14, which is controlled by means of a lever 15 and a hand operating-rod 16, which extends downwardly to within suitable reach of a person or attendant. The lever 15 may be weighted, as at 17, to counterbalance the weight of the rod 16. The lower end of the stack 18 extends a short distance below the enlarged part 12 and is provided with a gate or cut-off, as 19, so that the said stack may be closed at this point. By this construction the draft from the casing 1 is somewhat weakened when it reaches the enlarged portion 12 of the stack, so that chaff or any other substance carried by the products of combustion will settle down and collect at the lower end of the stack. The products of combustion will pass out through the top of the stack. When the roasting is finished, the damper 14 is closed in the stack and the gate or cut-off 19 may be opened, when the chaff or other substances collected in the stack may be deposited upon a floor or into any bag, barrel, or other receptacle, as hereinafter described.

The casing 1 is preferably provided with a hinged door, as 20, which is secured, by means of a rope or chain 21, with the counterbalance-weight 22, said rope or chain passing over a pulley 23, secured to the frame of the roaster.

24 indicates a bin or hopper from which the material to be roasted is passed into the drum at its center through a spout 25, and 26 an opening in said spout, through which a tester may be introduced in a well-known manner. I further utilize this opening 26 to permit of the introduction of a perforated hose-pipe 27, by means of which I introduce water into the drum after coffee is roasted, said pipe being connected to a hose 28. When in roasting coffee the coffee is watered, the door 20 is opened, the damper 14 being closed at the same time in the stack. Such chaff as is too heavy or for other reasons may not be taken by the draft into the smoke-stack will drop to the bottom of the casing 1, the heavier portion dropping into a draw-pan 29 and the lighter portion being drawn off by suction from a fan (not shown) through a pipe 30. A branch pipe 31 leads up from pipe 30 and is provided with a funnel-shaped mouth 32 at its upper end directly under the lower end 18 of the smoke-stack. When the gate 19 is opened, the chaff from part 18 of the stack drops through branch 31 into pipe 30 and is also carried off by the suction of the fan. Suitable dampers or gates, as 33 34, may be provided in pipe 30 and branch 31.

In a coffee-roaster of this character in which the coffee is carried about through the heated air by means of a rotating drum it is desired to have means for discharging the coffee from the periphery of the drum, and the manner in which I accomplish this result while the drum is revolving is an important feature of my invention.

The heat from the furnace 6 enters the drum 2 through an opening, as 36, passing into the casing 1 through the periphery of the drum, which is perforated, as illustrated in the drawings. At intervals about the periphery of the drum are formed discharge-openings, as 37 37, which are adapted to be controlled by means of slides or doors, as 38 38. These slides or doors of course travel in the casing 1, being secured to the periphery of the rotating drum 2. In order to open or close the slides while the drum is in operation, I mount a frame or slide 39, preferably in the upper part of the casing 1, the said slide carrying curved pieces or guides, as 40 40, which are adapted to engage lugs or projections 41, secured to the slides or doors 38. A rod 42 is secured to the slide or frame 39 and extends upwardly through the casing 1, where it is secured to the upper end of a hand operating-lever 43. The said lever 43 is fulcrumed, as at 44, upon the outer surface of the casing 1, its lower end extending down to within easy reach of the floor. It will be observed that the guides 40 are arranged so that their ends flare away from each other, so that they will always be in position to reach the projections 41 41 on the doors 38, no matter whether the doors are closed or opened. When the slide 39 is moved inwardly, the guide 40 will engage the projection 41 as the drum revolves and move the door, so as to open the discharge-aperture 37 in the periphery of the drum. When the slide 39 is pulled outwardly by means of the lever 43, the guides will again change the position of the door and close the openings or discharge-apertures 37.

In a roasting apparatus of this kind I find that it is desirable to heat or roast the coffee by using a gaseous fuel in the furnace, and for this purpose I construct a grate in the furnace of fire-brick, and I preferably place pieces of fire-brick upon the top of the said grate, as at 45. Below the grate is arranged a gas or air mixer and burner, as 46, as shown in Fig. 3, but omitted in Fig. 2, which is provided with a gas-inlet, as 47, and an air-blast inlet, as 48, the two being mixed and entering the furnace from the nozzle of the burner. By this arrangement the gas, when consumed, will heat the pieces of loose brick thoroughly and produce a strong volume of heated air for engaging the coffee in the roasting-drum. The air-blast and the gas-blast inlets 47 and 48 are preferably controlled by means of valves 49 and 50, respectively.

51 indicates an independent air-blast discharge-nozzle below the grate and pieces of fire-brick 45. By this means an extra supply of air is passed into and through the furnace, becoming heated as it passes through the hot fire-brick and giving a greater volume of heated air to be passed into the roaster, this extra volume being regulated in amount by means of a suitable valve 52.

As before stated herein, the means for introducing air above the grate is omitted in Fig. 3, it being deemed unnecessary to show it in all the figures illustrating the furnace.

It will be further apparent that I have devised a simple and yet effective means for controlling the discharge-apertures in the drum while the said drum is in motion. The coffee discharged from the said drum will be collected in the bottom of the casing 1 in any suitable manner, but preferably as described in my previous patent, above referred to. It will be seen also that I am enabled to use a gaseous fuel in my coffee-roaster and to great advantage, the same being under perfect control by means of the valve for regulating the air and gas inlets.

It will be apparent from the foregoing description that I am enabled to collect all chaff and like substances from the draft by the use of the enlarged stack, thus preventing it from passing out of the said stack with the smoke. It will also be seen that this waste material can be easily and quickly removed from the stack at any time and that ample provision is made for the removal of all chaff or other waste from the drum and casing.

Having now described my invention, what I claim as new, and desire to secure by Letters Patent, is—

1. An apparatus for roasting coffee and other material, comprising a casing, an agitating-drum therein, a furnace, a vertical stack adjacent to the drum having constricted upper and lower ends and an enlarged intermediate section, a draft-flue leading from the furnace into the drum, and a pipe leading from the casing into the enlarged section of the stack, substantially as described.

2. An apparatus for roasting coffee and other material, comprising a casing, an agitating-drum therein, a furnace, a vertical stack adjacent to the drum having constricted upper and lower ends and an enlarged intermediate section, a draft-flue leading from the furnace into the drum, and a pipe leading from the casing into the enlarged section of the stack, the stack being provided with a damper in its upper reduced end with means for operating the same, and with a discharge-gate in its lower end, substantially as described.

3. In a roasting apparatus, the combination with the roasting-chamber, of a vertical smoke-stack communicating therewith, a discharge-gate at the bottom of the stack, and connected suction-pipes leading from the roasting-chamber and smoke-stack, substantially as described.

4. An apparatus for roasting coffee or other material, comprising an inclosed casing, an agitating-drum therein, a furnace, a smoke-stack, a flue leading from the furnace into the drum, a flue leading from the drum to the stack, a discharge-gate at the bottom of the stack, a suction discharge-pipe leading from the bottom of the casing, a vertical branch pipe leading upward from the suction-pipe immediately under the discharge-gate of the stack, and suitable gates or dampers in said pipes, substantially as described.

5. An apparatus for roasting coffee, comprising an inclosing casing, an agitating-drum mounted therein, means for heating the said drum, an opening in the said casing for permitting the coffee to be watered, a counterbalanced door in the casing, a draft-outlet flue connected with the casing, a stack having an enlarged portion for receiving the draft from the said flue, the upper and lower ends of the said stack being reduced, a damper in the upper end, a weighted lever secured to the said damper, a rod connected with the said lever, whereby the damper may be operated by hand, a cut-off or gate in the lower reduced portion of the stack, the structure being such that, when the door is opened to water the coffee, the damper in the smoke-flue may be closed and the gate may be opened to discharge the contents of the stack, substantially as described.

6. An apparatus for roasting, comprising a rotary drum, an inclosing casing, doors adapted to slide longitudinally of the drum in the periphery thereof, radial projections on said doors, and guides attached to the casing and operating on said projections for opening and closing the doors, while the drum is in motion, substantially as described.

7. An apparatus for roasting, comprising and carrying an agitating-drum having discharge-apertures in its periphery, doors slidable lengthwise of the drum for closing said apertures, radial projections on the doors, and sliding guides on the casing for engaging said projections for opening or closing the doors while the drum is in motion, substantially as described.

8. An apparatus for roasting, comprising a revolving drum having discharge-apertures in its periphery, sliding doors for opening or closing said apertures, a fixed means for engaging said doors to open and close the same while the drum is in motion, comprising a slide carrying guides and a lever for operating the same, substantially as described.

9. In a roasting apparatus, the combination with a suitable casing, of a revolving drum mounted therein having apertures upon its periphery, slides or doors for closing the said apertures, a stationary slide secured to the said casing, curved guides secured to the said slide, projections mounted upon the discharge-door and arranged in the path of the said curved guides, whereby they will engage the same and open or close the doors according to the position of the slide; and a lever connected with the said slide and mounted outside the casing for moving the slide back and forth, substantially as described.

In testimony whereof I hereunto affix my signature in presence of two witnesses.

JOHN R. OKELL.

Witnesses:
  FRANK F. OKELL,
  BLANCHE KIRK.